(12) United States Patent
Lee et al.

(10) Patent No.: US 8,166,219 B2
(45) Date of Patent: Apr. 24, 2012

(54) METHOD AND APPARATUS FOR ENCODING/DECODING BUS SIGNAL

(75) Inventors: Jae Sung Lee, Seoul (KR); Sung Nam Kim, Daejeon (KR); Seong Woon Kim, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 448 days.

(21) Appl. No.: 12/566,496

(22) Filed: Sep. 24, 2009

(65) Prior Publication Data
US 2010/0146364 A1 Jun. 10, 2010

(30) Foreign Application Priority Data
Dec. 5, 2008 (KR) .................. 10-2008-0122876

(51) Int. Cl.
*G06F 13/38* (2006.01)
*H03M 9/00* (2006.01)

(52) U.S. Cl. ............ 710/71; 341/100; 341/101
(58) Field of Classification Search ........... 710/65, 710/66, 68, 71, 305; 712/300; 341/51, 96–98, 341/100, 101
See application file for complete search history.

(56) References Cited

U.S. PATENT DOCUMENTS

| | | | | |
|---|---|---|---|---|
| 5,649,124 A * | 7/1997 | Kreidl | | 710/305 |
| 6,026,124 A * | 2/2000 | Lee et al. | | 375/292 |
| 6,182,260 B1 * | 1/2001 | Kang et al. | | 714/755 |
| 6,489,900 B2 * | 12/2002 | Shin et al. | | 341/50 |
| 6,583,735 B2 * | 6/2003 | Henkel et al. | | 341/51 |
| 6,934,730 B2 * | 8/2005 | Direen et al. | | 708/250 |
| 7,675,438 B2 * | 3/2010 | Lee | | 341/100 |
| 7,817,068 B2 * | 10/2010 | Ghoneima et al. | | 341/55 |
| 7,881,089 B2 * | 2/2011 | Franceschini et al. | | 365/49.17 |
| 2009/0147882 A1 * | 6/2009 | Rha | | 375/295 |

FOREIGN PATENT DOCUMENTS

| | | |
|---|---|---|
| JP | 10-049271 A | 2/1998 |
| JP | 11-308281 A | 11/1999 |
| JP | 11-317773 A | 11/1999 |
| JP | 2004-172971 A | 6/2004 |
| JP | 2005-020382 A | 1/2005 |
| JP | 2005-045610 A | 2/2005 |
| KR | 10-2005-0064568 A | 6/2005 |
| KR | 10-2008-0070949 A | 8/2008 |

OTHER PUBLICATIONS

Manchester Coding Basics, Atmel Corporation, 2009.*
Kangmin Lee et al., "Low-Power Network-on-Chip for High-Performance SoC Design", IEEE Transactions on Very Large Scale Integration (VLSI) Systems, Feb. 2, 2006, pp. 148-160, vol. 14, No. 2.
Kangmin Lee et al., "SILENT: Serialized Low Energy Transmission Coding for On-Chip Interconnection Networks", Computer Aided Design, 2004, ICCAD-2004, IEEE/ACM International Conference as of Nov. 2004.
Jaesung Lee, "On-Chip Bus Serialization Method for Low-Power Communications", ETRI Journal, Aug. 2010, pp. 540-547, vol. 32 No. 4, ETRI.

* cited by examiner

*Primary Examiner* — Khanh Dang

(57) ABSTRACT

Provided is a bus signal encoding/decoding method and apparatus. The bus signal encoding method includes receiving a bus signal, XOR-operating all but the first byte sequence of the bus signal in a bitwise manner, inverting the even-numbered byte sequences of the XOR-operated bus signal in a bitwise manner, and serializing the inverted bus signal.

20 Claims, 8 Drawing Sheets

Original bus signal value

|    | t | t+1 | t+2 | t+3 | t+4 |
|----|---|-----|-----|-----|-----|
| D7 | 0 | 0   | 0   | 0   | 0   |
| D6 | 1 | 1   | 1   | 1   | 1   |
| D5 | 0 | 0   | 0   | 0   | 0   |
| D4 | 1 | 1   | 1   | 1   | 1   |
| D3 | 0 | 0   | 0   | 0   | 0   |
| D2 | 0 | 0   | 0   | 1   | 1   |
| D1 | 0 | 1   | 1   | 0   | 0   |
| D0 | 1 | 0   | 1   | 0   | 1   |

Serialization

|     | serial data | #Tr |
|-----|-------------|-----|
| t   | 0 1 0 1 0 0 0 1 | 5 |
| t+1 | 0 1 0 1 0 0 1 0 | 7 |
| t+2 | 0 1 0 1 0 0 1 1 | 5 |
| t+3 | 0 1 0 1 0 1 0 0 | 7 |
| t+4 | 0 1 0 1 0 1 0 1 | 7 |

Bus signal value after XOR encoding and invert encoding

|    | t | t+1 | t+2 | t+3 | t+4 |
|----|---|-----|-----|-----|-----|
| D7 | 0 | 1   | 0   | 1   | 0   |
| D6 | 1 | 1   | 0   | 1   | 0   |
| D5 | 0 | 1   | 0   | 1   | 0   |
| D4 | 1 | 1   | 0   | 1   | 0   |
| D3 | 0 | 1   | 0   | 1   | 0   |
| D2 | 0 | 1   | 0   | 0   | 0   |
| D1 | 0 | 0   | 0   | 0   | 0   |
| D0 | 1 | 0   | 1   | 0   | 1   |

Serialization

|     | serial data      | #Tr |
|-----|------------------|-----|
| t   | 0 1 0 1 0 0 0 1  | 5   |
| t+1 | 1 1 1 1 1 1 0 0  | 1   |
| t+2 | 0 0 0 0 0 0 0 1  | 1   |
| t+3 | 1 1 1 1 1 0 0 0  | 1   |
| t+4 | 0 0 0 0 0 0 0 1  | 1   |

METHOD AND APPARATUS FOR ENCODING/DECODING BUS SIGNAL

CROSS-REFERENCE TO RELATED APPLICATIONS

This application claims priority under 35 U.S.C. §119 to Korean Patent Application No. 10-2008-0122876, filed on Dec. 5, 2008, in the Korean Intellectual Property Office, the disclosure of which is incorporated herein by reference in its entirety.

TECHNICAL FIELD

The following disclosure relates to a method and apparatus for encoding/decoding a signal for data transmission, and in particular, to a method and apparatus for encoding parallel signals of a microprocessor bus into the serial signal and decoding the serial signal into parallel signals.

BACKGROUND

Most bus communication protocol adopts a communication process that transmits destination address information of transmit/receive (TX/RX) data in the first bus cycle and transmits/receives the TX/RX data in the next bus cycle. This communication process is performed in a register pipeline manner.

FIG. 1 is a diagram illustrating a process for transmitting data of a microprocessor bus.

Generally, an address bus transmits successive address data. Thus, there are many correlations between address data of the respective cycles. Generally, the address data increase or decrease successively, as illustrated in FIG. 1. In FIG. 1, 'A' denotes an overlap between the respective address data.

In this manner, signals of an address bus are small in the signal transition frequency (i.e., the number of signal transitions). However, if the address bus signals are serialized prior to transmission, their correlation is broken. If the address bus signals are serialized with their correlation broken, their signal transition increases greatly.

This is also true in the case of a data bus. Referring to FIG. 1, data bus signals, including data signals Data, Data1, Data2 and Data3 corresponding respectively to address signals A, A+1, A+2 and A+3, generally have a correlation therebetween like the address bus signals.

For example, in the case of multimedia data including image, audio, or video requiring a large amount of data transmission, the adjacent data signals generally have little or no difference therebetween.

However, like the address bus signals, if the multimedia data signals are serialized prior to transmission, their correlation is broken and their signal transition increases accordingly.

A signal transmission path or a conductive line external to the microprocessor has thousands to tens of thousands times the Capacitance (C) of a conductive line in a semiconductor device. Therefore, the former may consume thousands to tens of thousands times more power per signal transition than the latter.

What is therefore required is a method for preventing a sudden increase in signal transition frequency to suppress an increase in power consumption, when serializing the bus signals prior to transmission.

SUMMARY

In one general aspect, a bus signal encoding method includes: receiving a bus signal; XOR-operating all but the first byte sequence of the bus signal in a bitwise manner; inverting the even-numbered byte sequences of the XOR-operated bus signal in a bitwise manner; and serializing the inverted bus signal.

The bus signal encoding method may further include gray-encoding the first byte sequence of the bus signal between the XOR operation and the inverting operation.

The bus signal encoding method may further include gray-encoding the first byte sequence of the bus signal between the inverting operation and the serializing operation.

In another general aspect, a bus signal decoding method includes: deserializing a serial bus signal; inverting the even-numbered byte sequences of the deserialized signal in a bitwise manner; and XOR-operating all but the first byte sequence of the inverted signal in a bitwise manner.

The bus signal decoding method may further include gray-decoding the first byte sequence of the signal between the deserializing operation and the inverting operation.

The bus signal decoding method may further include gray-decoding the first byte sequence of the signal between the inverting operation and the XOR operation.

In another general aspect, a bus signal encoding apparatus includes: an XOR operator XOR-operating a bus signal in a bitwise manner; an inverter inverting the bus signal, outputted from the XOR operator, in a bitwise manner; and a serializer serialising the bus signal outputted from the inverter, wherein the XOR operator XOR-operates all but the first byte sequence of the bus signal and the inverter inverts the even-numbered byte sequences of the bus signal.

The bus signal encoding apparatus may further include a gray encoder that gray-encodes the first byte sequence of the bus signal outputted from the XOR operator and outputs the result to the inverter.

The bus signal encoding apparatus may further include a gray encoder that gray-encodes the first byte sequence of the bus signal outputted from the inverter and outputs the result to the serializer.

The gray encoder may include an XOR chain that uses the first bit value as the operation result of the first bit and XOR-operates the current bit with the operation result of the previous bit from the second bit.

The gray encoder may include a lookup table.

In another general aspect, a bus signal decoding apparatus includes: a deserializer deserializing a serial bus signal; an inverter inverting the signal, outputted from the deserializer, in a bitwise manner; and an XOR operator XOR-operating the signal, outputted from the inverter, in a bitwise manner, wherein the inverter inverts the even-numbered byte sequences of the signal and the XOR operator XOR-operates all but the first byte sequence of the signal.

The bus signal decoding apparatus may further include a gray decoder that gray-decodes the signal outputted from the deserializer and outputs the result to the inverter.

The bus signal decoding apparatus may further include a gray decoder that gray-decodes the signal outputted from the inverter and outputs the result to the XOR operator.

The gray decoder may include an XOR chain that uses the first bit value as the operation result of the first bit and XOR-operates the current bit with the operation result of the previous bit from the second bit.

The gray decoder may include a lookup table.

Other features and aspects will be apparent from the following detailed description, the drawings, and the claims.

DETAILED DESCRIPTION OF EMBODIMENTS

Figure 1:
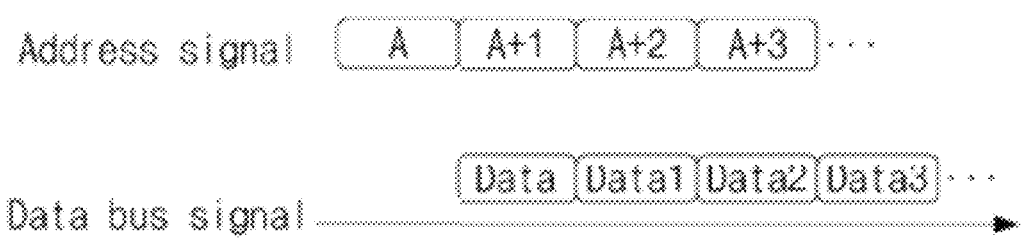
FIG. 1 is a diagram illustrating a process for transmitting data of a microprocessor bus.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/of systems described herein will be suggested to those of ordinary skill in the art. Also, descriptions of well-known functions and constructions may be omitted for increased clarity and conciseness.

The exemplary embodiments encode bus signals prior to serialization of the bus signals. Thus, the bus signals are converted into signals that do not increase in the signal transition frequency (i.e., the number of signal transitions) in the serialization. Therefore, the power consumption throughout data communication is reduced without any communication delay.

Hereinafter, a method and apparatus for encoding/decoding bus signals according to the exemplary embodiments will be described in detail with reference to the accompanying drawings.

Encoding Method and Apparatus

Figure 2:
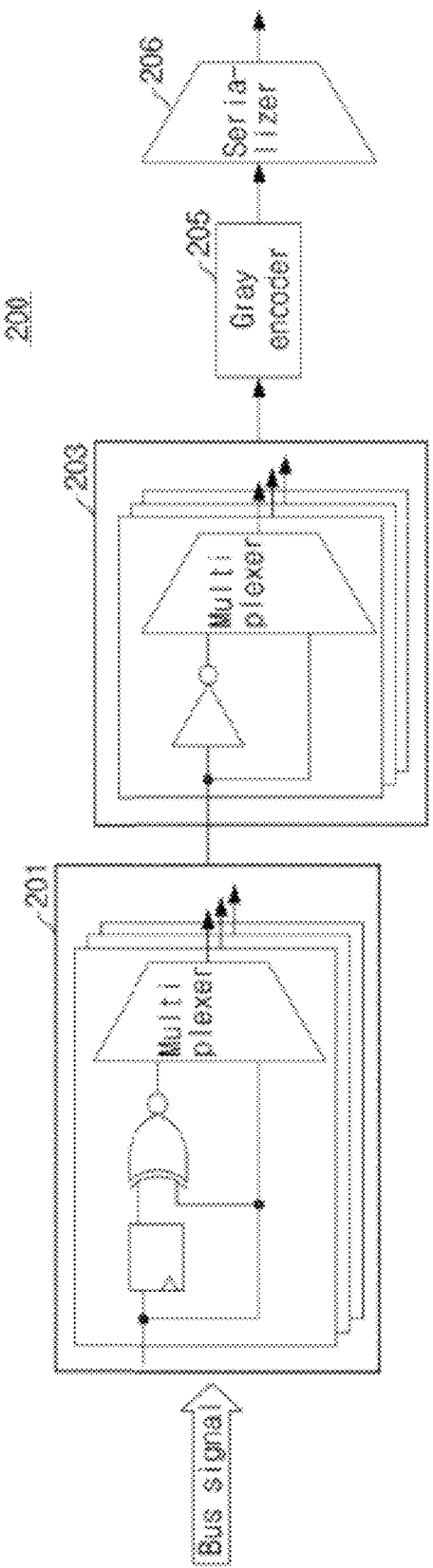
FIG. 2 is a block diagram of a bus signal encoding apparatus according to an exemplary embodiment.

FIG. 2 is a block diagram of a bus signal encoding apparatus according to an exemplary embodiment.

Referring to FIG. 2, a bus signal encoding apparatus 200 may include an XOR operator 201, an inverter 203, and a serializer 206.

The XOR operator 201 receives a parallel bus signal in a bitwise manner and XOR-operates the received parallel bus signal in a bitwise manner Herein, the XOR operator 201 XOR-operates all but the first byte sequence of the parallel bus signal in a bitwise manner In an exemplary embodiment, the byte sequence means byte addresses or data that are transmitted together in the parallel bus signal.

The inverter 203 inverts the XOR-operated parallel bus signal except the first byte sequence, which is outputted from the XOR operator 201, in a bitwise manner. Herein, the inverter 203 inverts the even-numbered byte sequences of the parallel bus signal in a bitwise manner.

The serializer 206 serializes the inverted parallel bus signal outputted from the inverter 203.

The bus signal encoding apparatus 200 may further include a gray encoder 205 that gray-encodes the first byte sequence of the parallel bus signal.

Herein, the gray encoder 205 outputs the first bit of a byte, which is to be encoded, as a gray-coding result of the first bit, and outputs results of XOR-operating of current bit with the operation result of previous bit, as the gray-coding result of the another bits from second bit of the byte.

In an exemplary embodiment, the gray encoder 205 may be disposed between the inverter 203 and the serializer 206 as illustrated in FIG. 2. In another exemplary embodiment, the gray encoder 205 may be disposed between the XOR operator 201 and the inverter 203.

In an exemplary embodiment, the gray encoder 205 may be implemented using a lookup table (LUT) storing the results.

In another exemplary embodiment, the gray encoder 205 may be implemented musing a so-called XOR chain that uses the first bit value as the operation result of the first bit and XOR-operates the current bit with the operation result of the previous bit from the second bit.

Thus, the bus signal encoding apparatus 200 can be implemented more simply by using the LUT or the XOR chain.

Figure 3:
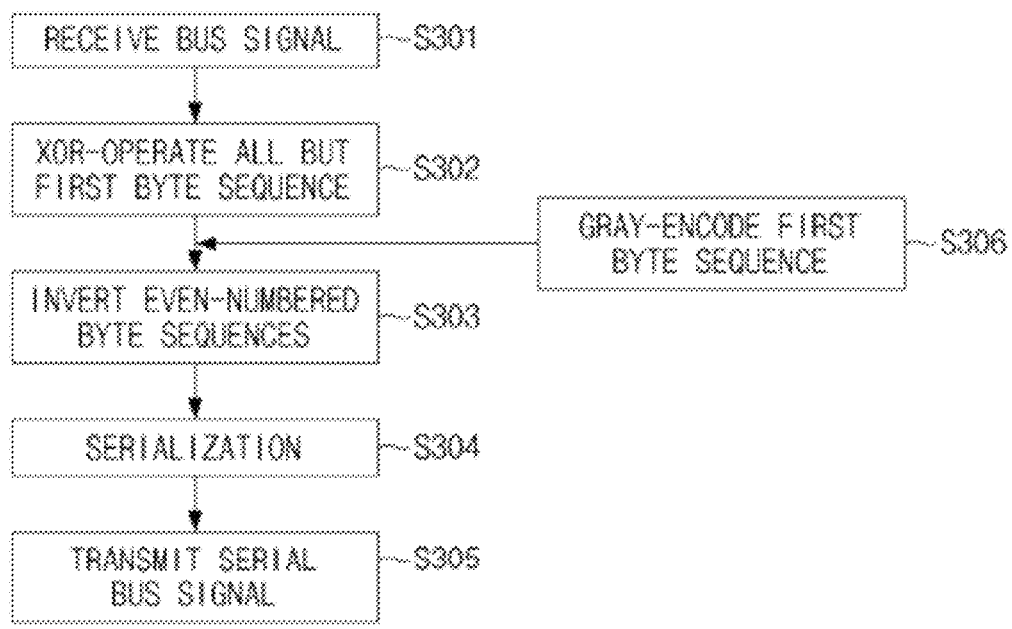
FIG. 3 is a flow chart illustrating a bus signal encoding method according to an exemplary embodiment.

FIG. 3 is a flow chart illustrating a bus signal encoding method according to an exemplary embodiment.

Referring to FIG. 3, a bus signal encoding method receives a parallel bus signal in operation S301. In operation S302, the bus signal encoding method XOR-operates all but the first byte sequence of the received parallel bus signal in a bitwise manner.

Thereafter, in operation S303, the bus signal encoding method inverts the even-numbered byte sequences of the parallel bus signal in a bitwise manner.

In operation S304, the bus signal encoding method serializes the inverted parallel bus signal prior to encoding.

In operation S305, the bus signal encoding method transmits the serialized bus signal to a detination device.

The bus signal encoding method may further include an operation S306 of gray-encoding the first byte sequence of the parallel bus signal, between the operations S302 and S303 or between the operations S303 and S304.

Herein, the gray encoding is outputting the first bit of a byte, which is to be encoded, as a gray-coding result of the first bit, and outputting results of XOR-operating of current bit with the operation result of previous bit, as the gray-coding result of the another bits from second bit of the byte.

Because the first byte sequence is gray-encoded, the first byte sequence excluded from encoding is included, thus making it possible to reduce the transition of the serialized bus signal.

Decoding Method and Apparatus

Figure 4:
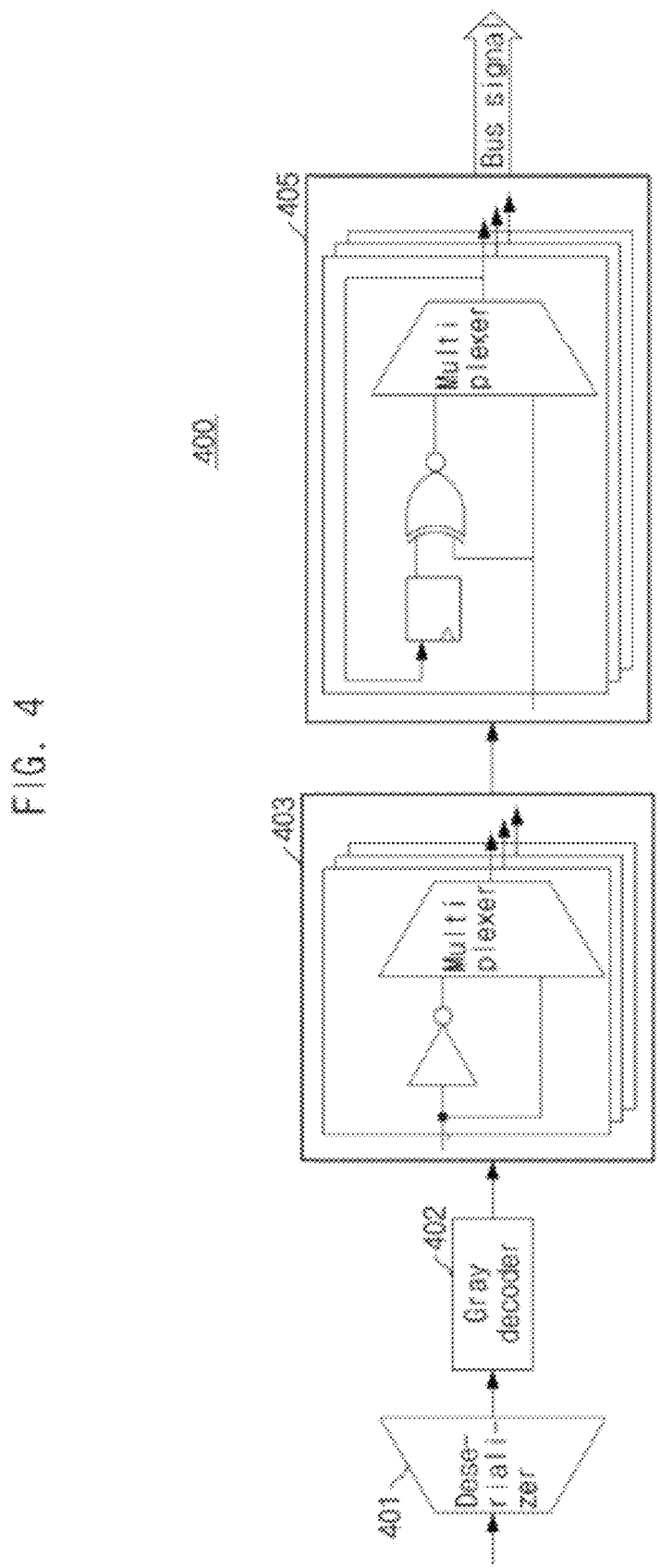
FIG. 4 is a block diagram of a bus signal decoding apparatus according to an exemplary embodiment.

FIG. 4 is a block diagram of a bus signal decoding apparatus according to an exemplary embodiment.

Referring to FIG. 4, a bus signal decoding apparatus 400 may include a deserializer 401, an inverter 403, and an XOR operator 405.

The deserializer 401 deserializes a received serial bus signal into a parallel signal.

The inverter 403 inverts the parallel signal, outputted from the deserializer 401, in a bitwise manner. Herein, the inverter 403 inverts the even-numbered byte sequences of the parallel signal in a bitwise manner.

The XOR operator 405 XOR-operates the output signal of the inverter 403 in a bitwise manner Herein, the XOR operator 405 XOR-operates all but the first byte sequence of the parallel signal in a bitwise manner to restore the parallel signal to the original bus signal.

If the bus signal is gray-encoded by the bus signal encoding apparatus 200, the bus signal decoding apparatus 400 may further include a gray decoder 402 that gray-decodes the first byte sequence of the parallel signal.

Herein, the gray decoder 402 outputs the first bit of a byte, which is to be decoded, as a decoding result of the first bit, outputs results of XOR-operating of current bit with the operation result of previous bit, as the decoding result of the another bits from second bit of the byte.

In an exemplary embodiment, the gray decoder 402 may be disposed between the deserializer 401 and the inverter 403 as illustrated in FIG. 4. In another exemplary embodiment, the gray decoder 402 may be disposed between the inverter 403 and the XOR operator 405.

In exemplary embodiments, the gray decoder 402 may be implemented using an XOR chain or a lookup table (LUT). Thus, the bus signal decoding apparatus 400 can be implemented more simply by using the LUT or the XOR chain.

Figure 5:
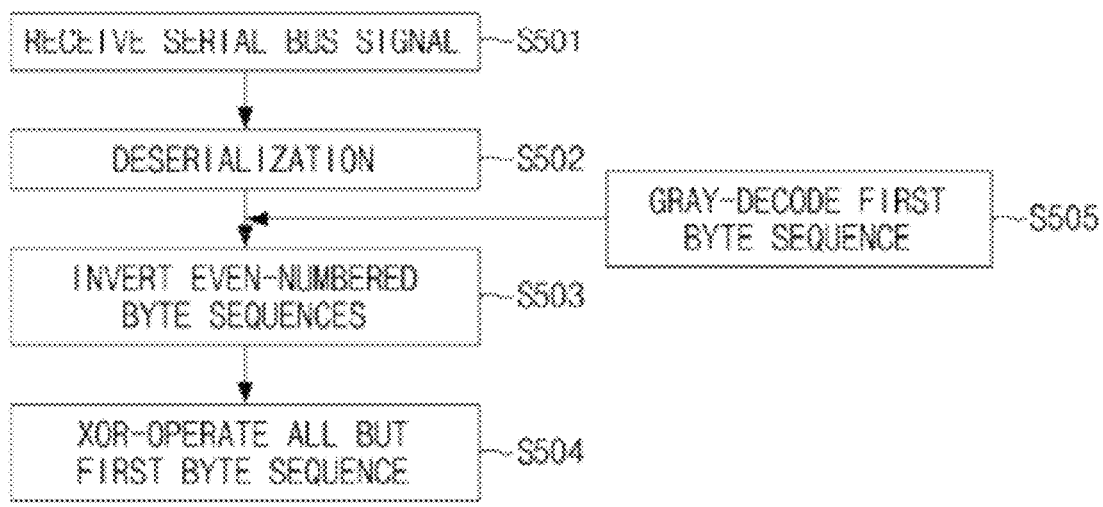
FIG. 5 is a flow chart illustrating a bus signal decoding method according to an exemplary embodiment.

FIG. 5 is a flow chart illustrating a bus signal decoding method according to an exemplary embodiment.

Referring to FIG. 5, a bus signal decoding method receives a serial bus signal in operation S501. In operation S502, the bus signal decoding method deserializes the received serial bus signal into a parallel signal.

In operation S503, the bus signal decoding method inverts the deserialized parallel signal in a bitwise manner.

Even in the bus communication performed between transactions in a pipeline manner, data are transmitted in units of certain length (e.g., in a burstwise manner or in a packetwise manner Therefore, a receiving circuit can detect a node of each transaction even between successive transactions and thus can detect the first base signal value (i.e., the first byte sequence) of each transaction.

Thus, the bus signal decoding method detects whether received data are base signal values, and inverts the even-numbered byte sequences in a bitwise manner.

In operation S504, the bus signal decoding method XOR-operates all but the first byte sequence of the inverted parallel signal in a bitwise maimer to restore the original bus signal.

The bus signal decoding method may further include an operation S505 of gray-decoding the first byte sequence of the parallel signal, between the operations S502 and S503 or between the operations S503 and S504.

Herein, the gray decoding is outputting the first bit of a byte, which is to be decoded, as a decoding result of the first bit, and outputting results of XOR-operating of current bit with the operation result of previous bit, as the decoding result of the another bits from second bit of the byte.

If the gray decoding is performed after the operation S502, whether received data are base signal values is detected prior to the gray decoding, as described above.

Comparative Example

Figure 6:
FIG. 6 is a diagram illustrating serialization of a bus signal according to the related art.

FIG. 6 is a diagram illustrating serialization of a bus signal according to the related art.

Referring to FIG. 6, 't' to 't+4' denote byte sequences representing 5 byte addresses or data that are transmitted successively.

'D0' to D7' denote the bit positions of each byte. Herein, a numeral following 'D' denotes the position of each bit.

Starting from the first byte sequence t, hexadecimal data of 51$h$, 52$h$, 53$h$, 54$h$ and 55$h$ are expressed as binary numbers and they are sequentially transmitted through an 8-bit bus.

As can be seen from FIG. 6, the signal transition frequency is a total of 7 times (i.e., 4 times at 'D0', 2 times at 'D1' and 1 time at 'D2') if the bus signal is transmitted without serialization, but the signal transition frequency is a total of 31 times if the bus signal is serialized prior to transmission.

Figure 7:
FIG. 7 is a diagram illustrating serialization of a bus signal according to an exemplary embodiment.

FIG. 7 is a diagram illustrating serialization of a parallel bus signal after XOR-operating all but the first byte sequence of the parallel bus signal in a bitwise manner and inverting the even-numbered byte sequences in a bitwise manner according to an exemplary embodiment.

Referring to FIG. 7, the signal transition frequency greatly decreases to 13 times if the other byte sequences t+1, t+2, t+3 and t+4 except the first byte sequence t are XOR-operated in a bitwise manner and the even-numbered byte sequences t+1 and t+3 are inverted in a bitwise manner.

Figure 8:
FIG. 8 is a diagram illustrating serialization of a bus signal according to another exemplary embodiment.

FIG. 8 is a diagram illustrating serialization of a parallel bus signal after additionally performing gray encoding on the first byte sequence of the parallel bus signal according to another exemplary embodiment.

As can be seen from the serialization process of FIG. 7, the signal transition of the first byte sequence t is the same as in FIG. 6 through the bus signal encoding.

Because the bus signal transmission is explicitly divided by the start and end of the transaction, a circuit of receiving the serialized signal value can detect the time period (or the transmission position) of the first base signal value (i.e., the first byte sequence) of the transmission unit. Thus, the decoding is possible even if only the first base signal value, i.e., the first byte sequence of the parallel bus signal is encoded separately.

That is, because the decoding is possible, the signal transition can be further reduced by gray-encoding only the first byte sequence.

As described above, the gray decoding is outputting the first bit of a byte, which is to be decoded, as a decoding result of the first bit, and outputting results of XOR-operating of current bit with the operation result of previous bit, as the decoding result of the another bits from second bit of the byte.

As illustrated in FIG. 8, the signal transition frequency of the first byte sequence t decreases to 3 times and the total signal transition frequency also decreases to 7 times as a result of gray-encoding the first byte sequence t.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

For example, although it has been described that the exemplary embodiment gray-encodes the first byte sequence after inverting the even-numbered byte sequences, the present invention is not limited thereto. That is, because the first byte sequence is not inverted, the first byte sequence may be gray-encoded before inverting the even-numbered byte sequences.

Also, although it has been described that the exemplary embodiment transmits 5 bus signals successively, the present invention is not limited thereto. It can be seen that the signal transition frequency greatly decreases in comparison with the serialization method of the related art as the number of the bus signals increases.

Also, if the signal need not be gray-encoded, a 1-bit guard signal or 1 transmission cycle may be added to notify this.

What is claimed is:

1. A method for encoding a bus signal, comprising:
   receiving a bus signal;
   XOR-operating all but the first byte sequence of the bus signal in a bitwise manner;
   inverting the even-numbered byte sequences of the XOR-operated bus signal in a bitwise manner; and
   serializing the inverted bus signal.

2. The method of claim 1, further comprising gray-encoding the first byte sequence of the bus signal between the XOR operation and the inverting operation.

3. The method of claim 1, further comprising gray-encoding the first byte sequence of the bus signal between the inverting operation and the serializing operation.

4. A method for decoding a bus signal, comprising:
   deserializing a serial bus signal;
   inverting the even-numbered byte sequences of the deserialized signal in a bitwise manner; and
   XOR-operating all but the first byte sequence of the inverted signal in a bitwise manner.

5. The method of claim 4, further comprising gray-decoding the first byte sequence of the signal between the deserializing operation and the inverting operation.

6. The method of claim 4, further comprising gray-decoding the first byte sequence of the signal between the inverting operation and the XOR operation.

7. An apparatus for encoding a bus signal, comprising:
   an XOR operator XOR-operating a bus signal in a bitwise manner;
   an inverter inverting the bus signal, outputted from the XOR operator, in a bitwise manner; and
   a serializer serializing the bus signal outputted from the inverter,
   wherein the XOR operator XOR-operates all but the first byte sequence of the bus signal and the inverter inverts the even-numbered byte sequences of the bus signal.

8. The apparatus of claim 7, further comprising a gray encoder that gray-encodes the first byte sequence of the bus signal outputted from the XOR operator and outputs the result to the inverter.

9. The apparatus of claim 8, wherein the gray encoder comprises an XOR chain that uses the first bit value as the operation result of the first bit and XOR-operates the current bit with the operation result of the previous bit from the second bit.

10. The apparatus of claim 8, wherein the gray encoder comprises a lookup table.

11. The apparatus of claim 7, further comprising a gray encoder that gray-encodes the first byte sequence of the bus signal outputted from the inverter and outputs the result to the serializer.

12. The apparatus of claim 11, wherein the gray encoder comprises an XOR chain that uses the first bit value as the operation result of the first bit and XOR-operates the current bit with the operation result of the previous bit from the second bit.

13. The apparatus of claim 11, wherein the gray encoder comprises a lookup table.

14. An apparatus for decoding a bus signal, comprising:
   a deserializer deserializing a serial bus signal;
   an inverter inverting the signal, outputted from the deserializer, in a bitwise manner; and
   an XOR operator XOR-operating the signal, outputted from the inverter, in a bitwise manner,
   wherein the inverter inverts the even-numbered byte sequences of the signal and the XOR operator XOR-operates all but the first byte sequence of the signal.

15. The apparatus of claim 14, further comprising a gray decoder that gray-decodes the signal outputted from the deserializer and outputs the result to the inverter.

16. The apparatus of claim 15, wherein the gray decoder comprises an XOR chain that uses the first bit value as the operation result of the first bit and XOR-operates the current bit with the operation result of the previous bit from the second bit.

17. The apparatus of claim 15, wherein the gray decoder comprises a lookup table.

18. The apparatus of claim 14, further comprising a gray decoder that gray-decodes the signal outputted from the inverter and outputs the result to the XOR operator.

19. The apparatus of claim 18, wherein the gray decoder comprises an XOR chain that uses the first bit value as the operation result of the first bit and XOR-operates the current bit with the operation result of the previous bit from the second bit.

20. The apparatus of claim 18, wherein the gray decoder comprises a lookup table.

* * * * *